June 13, 1950     G. G. GRIGSBY     2,511,581
CONVEYER BELT

Filed June 24, 1946     2 Sheets-Sheet 1

INVENTOR
GAIL G. GRIGSBY
BY John H. Cassidy
ATTORNEY

June 13, 1950 G. G. GRIGSBY 2,511,581
CONVEYER BELT

Filed June 24, 1946 2 Sheets-Sheet 2

INVENTOR
GAIL G. GRIGSBY
BY John H. Cassidy
ATTORNEY

Patented June 13, 1950

2,511,581

UNITED STATES PATENT OFFICE 2,511,581

CONVEYER BELT

Gail G. Grigsby, Desloge, Mo.

Application June 24, 1946, Serial No. 678,801

1 Claim. (Cl. 74—232)

This invention relates to conveyor belts.

It is a general object of the invention to provide a conveyor belt of superior quality which is possessed of structural features contributing to a longer useful life than has heretofore been known in the art.

More specifically, it is an object of the invention to provide a conveyor belt which will not split or break along lines parallel to the warp threads of the fabric by means of which it is reenforced.

It is also an object of the invention to provide an improved fabric for use in rubber conveyor belts which is capable of supporting metallic reenforcing strands therein in a manner to prevent separation of these strands from the rubber due to continued flexing of the belt.

A still further object of the invention is to provide a conveyor belt having as a part thereof improved reenforced plies making possible a reduction in belt thickness with increased longitudinal and transverse strength, said plies being so arranged as to reduce internal friction in the belt thereby contributing to its longer life.

Figure 1:
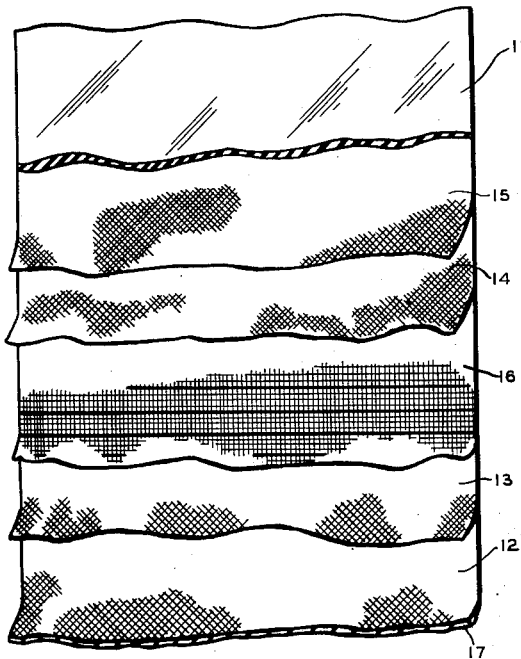
Figure 3:
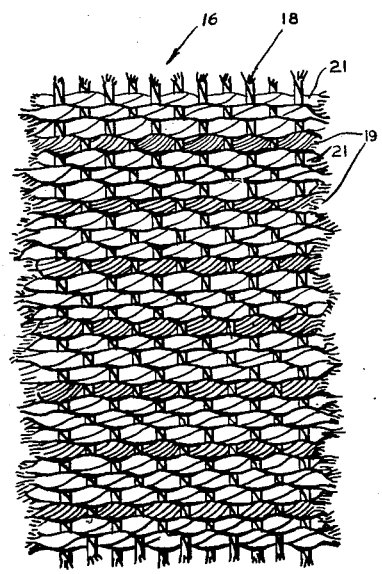
Figure 2:
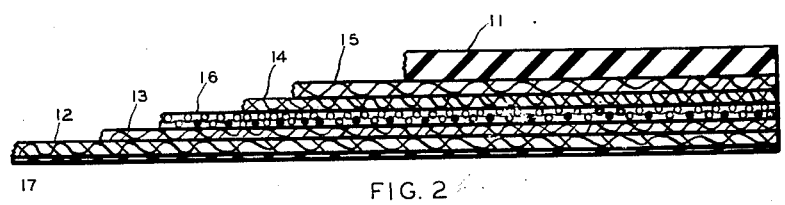
Figure 4:
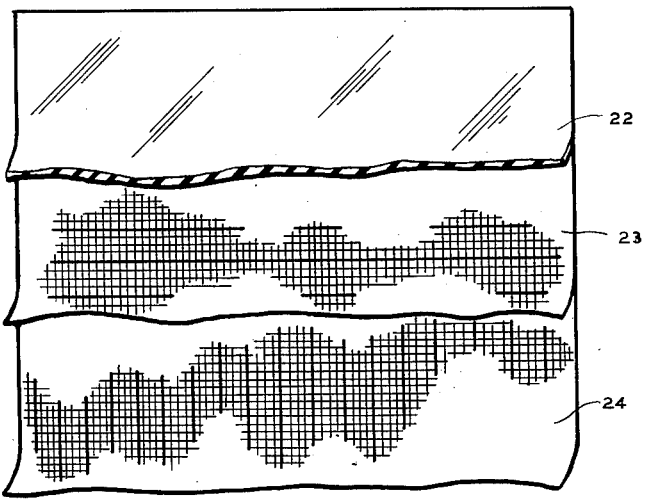
Figure 6:
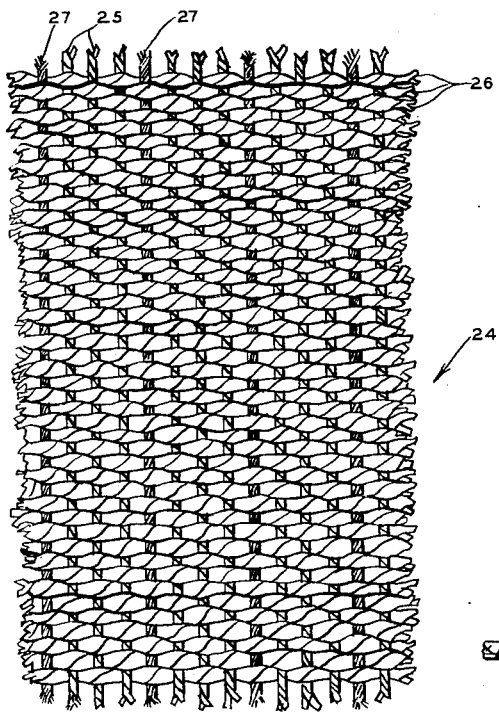
Figure 5:
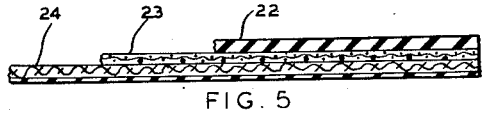

Other objects and advantages will become apparent as the description proceeds and a more comprehensive understanding of the invention will be afforded from the following detailed specification when considered in conjunction with the accompanying drawing, in which Fig. 1 is a top view of a conveyor belt embodying the instant invention and showing certain structural features of the same in exposed sections, Fig. 2 is a vertical sectional view of the belt taken lengthwise thereof, Fig. 3 is a view showing the construction of an improved reenforcing fabric forming a part of the belt, Fig. 4 is a top view of a conveyor belt illustrating the invention in a modified form, Fig. 5 is a vertical section of the belt shown in Fig. 4, and Fig. 6 is a view showing the construction of modified forms of the fabric illustrated in Fig. 3.

In a preferred embodiment of the invention a belt is provided in which a tread, or material supporting layer 11 of elastic material, such as rubber, is strengthened by a plurality of impregnated fabric layers, or plies, 12, 13, 14 and 15. The number of plies here shown is by way of example, only, it being understood that any desired number may be used. Also, it is to be understood that these plies may be made of any suitable material, such as cotton or rayon fabrics, impregnated with rubber or the like. Lying between the plies 13 and 14 is a fifth ply which constitutes a rubber impregnated metallic reenforced fabric 16, and all of the plies are united each with the other and to the tread 11 as by vulcanizing. In this regard it is to be noted that the impregnating material of the ply 12 completely covers its fabric, and, in a sense may be considered as forming a layer 17 of the elastic material.

With regard to the ply 16 (Fig. 3), a fabric similar in weight to that used in the layers 12, 13, 14 and 15 is woven to have its warp strands 18 crossed at spaced intervals with metal wires or cables 19 woven therethrough. The woof strands 21 lying between the metallic woof strands 19 are of the same material as the warp strands 18 and are in greater number than the latter. In this regard, there is no fixed ratio of organic woof threads to metallic woof threads, the only requirement being that the fabric have a sufficient number of metallic threads to give the belt its required strength and that these threads be woven into the fabric.

Further, the metallic strands are not limited to any particular structure, size or shape. They may be wire or stranded cable. In practice, wire cable such as that used for airplane controls has been found to be satisfactory. Moreover, it has been found that copper-coated steel strands are preferable since the vulcanizing material of the belt adheres securely thereto and no separation is exhibited.

As is well known, present day conveyor belts are most usually made from fabric reenforced rubber, the fabric being vulcanized therein to provide added strength and prevent stretching. In addition to failures which result from transverse splitting, these belts are also subject to equally destructive failures from longitudinal separation. Accordingly, in the instant invention the reenforcing fabric 16 is vulcanized in the belt with its warp threads extending along its length. In this manner, the belt is crossed by the metallic strands 19 and is thereby reenforced against longitudinal splitting.

Where long unsupported stretches of belting are used, it has been proposed to reenforce these belts against transverse failures with metallic strands extending lengthwise of the belt, the same being vulcanized in rubber between the fabric layers of the belt. This type of reenforcement has never been successful to prevent longitudinal separation due to failures resulting from the separation of the rubber from the metallic strands caused by the flexing of the belt over its driving pulleys. In the instant invention, this long unsolved problem has been overcome by weaving the metallic strands into the organic fabric. By means of alternate layers of metallic reenforced fabrics in which the metal strands are warp in one instance and woof in another, both longitudinal and transverse reenforcing may be incorporated in the same belt without rubber to metal separation and frictional disturbance. In such case, a belt similar to that illustrated in Fig. 4 may be provided. Here, a tread 22 may have vulcanized thereto a first ply, such as 23, which is reenforced with a fabric such as that illustrated in Fig. 3, and a second ply 24 reenforced with the fabric illustrated in Fig. 6. As will be noted, the fabric of the latter has a plurality of organic warp strands 25 which have interwoven therewith a plurality of organic woof strands 26. Here, however, the woof strands are crossed by and interwoven with a plurality of metallic reenforcing strands 27 at spaced intervals along the woofs.

In this particular belt construction the amount of reenforcing can be selected to give sufficient strength, both transverse and longitudinal, such that only two plies are needed. This reduces materially the thickness of the belt, with an attendant reduction in the belt load with no sacrifice of strength or added stretching. Moreover, internal friction is reduced, adding to the life of the belt.

Various changes may be made in the details of construction, within the scope of the appended claim, without departing from the spirit of this invention. Parts of the invention may be used without the whole and improvements may be added while retaining some or all of the advantages of the invention.

What is claimed is:

A conveyor belt comprising two layers of elastic material, a plurality of organic fabric layers imbedded therebetween and a metallic reenforced organic fabric layer carried between at least two of said organic fabric layers, said reenforced organic fabric layer comprising a plurality of organic warp strands crossed by and interwoven with a plurality of organic woof strands and a plurality of metallic woof strands interwoven with said organic warp strands at spaced intervals therealong.

GAIL G. GRIGSBY.

REFERENCES CITED

The following references are of record in the file of this patent:

UNITED STATES PATENTS

| Number | Name | Date |
| --- | --- | --- |
| 308,044 | Teter | Nov. 11, 1884 |
| 353,873 | Meacom | Dec. 7, 1886 |
| 502,976 | Kuchler | Aug. 8, 1893 |
| 547,788 | Hoffman | Oct. 15, 1895 |
| 676,565 | Lindsay | June 18, 1901 |
| 1,329,713 | Kawai | Feb. 3, 1920 |
| 1,475,250 | Sundh | Nov. 27, 1923 |

FOREIGN PATENTS

| Number | Country | Date |
| --- | --- | --- |
| 6,374 | Great Britain | 1886 |
| 73,664 | Germany | Feb. 28, 1894 |